United States Patent
Decrop et al.

(10) Patent No.: US 12,014,734 B2
(45) Date of Patent: Jun. 18, 2024

(54) DYNAMIC BOUNDARY CREATION FOR VOICE COMMAND AUTHENTICATION

(71) Applicant: International Business Machines Corporation, Armonk, NY (US)

(72) Inventors: Clement Decrop, Arlington, VA (US); Tushar Agrawal, West Fargo, ND (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 17/382,540

(22) Filed: Jul. 22, 2021

(65) Prior Publication Data

US 2023/0029088 A1   Jan. 26, 2023

(51) Int. Cl.
*G10L 15/22* (2006.01)
*G10L 15/06* (2013.01)
*G10L 15/16* (2006.01)

(52) U.S. Cl.
CPC ............ *G10L 15/22* (2013.01); *G10L 15/063* (2013.01); *G10L 15/16* (2013.01); *G10L 2015/223* (2013.01)

(58) Field of Classification Search
CPC ....... G10L 15/22; G10L 15/063; G10L 15/16; G10L 2015/223; G06F 3/167
See application file for complete search history.

(56) References Cited

U.S. PATENT DOCUMENTS

| | | | |
|---|---|---|---|
| 8,018,329 B2 | 9/2011 | Morgan et al. | |
| 9,043,329 B1 | 5/2015 | Patton et al. | |
| 9,819,680 B2 | 11/2017 | Grigg et al. | |
| 10,169,850 B1 * | 1/2019 | Carey | G06F 3/011 |
| 11,232,644 B1 * | 1/2022 | Lee | G06F 3/04815 |
| 11,405,436 B1 * | 8/2022 | Mindlin | H04L 65/764 |
| 11,924,209 B2 * | 3/2024 | Kumar B | H04L 63/102 |

(Continued)

FOREIGN PATENT DOCUMENTS

KR   20190003029 A   1/2019

OTHER PUBLICATIONS

Sudharsan et al., "Smart speaker design and implementation with biometric authentication and advanced voice Interaction capability." 27th AICS Irish Conference on Artificial Intelligence and Cognitive Science, Galway, Dec. 5-6, 2019.

(Continued)

*Primary Examiner* — Michael Colucci
(74) *Attorney, Agent, or Firm* — Daniel M. Yeates

(57) ABSTRACT

A computer-implemented method executes voice commands issued from within a command boundary. The method includes defining a command boundary for a VCD, where the command boundary is based on receiving an input from a user. The method further includes receiving, from the user and by the VCD, a voice command. The method also includes determining an origination location of the voice command. The method includes classifying the voice command into a command category. The method further includes executing the voice command in response to determining the origination location is within the command boundary for the VCD. The method also includes storing a set of data for the voice command.

20 Claims, 6 Drawing Sheets

(56) References Cited

U.S. PATENT DOCUMENTS

| | | | |
|---|---|---|---|
| 2011/0043515 A1 | 2/2011 | Stathis | |
| 2011/0066634 A1* | 3/2011 | Phillips | G10L 15/22 707/769 |
| 2013/0028508 A1* | 1/2013 | Perronnin | G06V 30/422 382/159 |
| 2013/0099977 A1 | 4/2013 | Sheshadri et al. | |
| 2014/0164118 A1 | 6/2014 | Polachi | |
| 2015/0010167 A1* | 1/2015 | Arling | H04L 12/282 381/105 |
| 2015/0082400 A1 | 3/2015 | Fakhrai et al. | |
| 2016/0026779 A1 | 1/2016 | Grigg et al. | |
| 2016/0104480 A1* | 4/2016 | Sharifi | G10L 17/22 704/254 |
| 2017/0032141 A1* | 2/2017 | Hungate | H04W 4/021 |
| 2018/0232056 A1* | 8/2018 | Nigam | G06F 3/167 |
| 2019/0052523 A1 | 2/2019 | Jawaharlal et al. | |
| 2019/0108353 A1 | 4/2019 | Sadeh et al. | |
| 2019/0108837 A1* | 4/2019 | Christoph | G10L 15/22 |
| 2020/0219484 A1* | 7/2020 | Kwatra | G10L 15/075 |
| 2020/0334907 A1 | 10/2020 | Bender et al. | |
| 2020/0365153 A1* | 11/2020 | Aquino | G10L 15/26 |
| 2020/0411003 A1 | 12/2020 | Gordon et al. | |
| 2021/0217423 A1* | 7/2021 | Rakshit | G10L 15/22 |
| 2022/0189470 A1* | 6/2022 | Sharifi | G10L 15/02 |
| 2022/0280007 A1* | 9/2022 | Jang | A47L 11/4011 |
| 2022/0308660 A1* | 9/2022 | Patnaikuni | H04L 67/12 |
| 2023/0321536 A1* | 10/2023 | Hunt | A63F 13/25 463/31 |

OTHER PUBLICATIONS

Shen et al., Voice localization using nearby wall reflections. In Proceedings of the 26th Annual International Conference on Mobile Computing and Networking (MobiCom '20). ACM, Article 7, 1-14. 2020.

"Mobile Security Market by End User (Individual and Enterprise (Solution (Authentication, Application Security, & Device Security), Service, Deployment Mode, Organization Size, Vertical), Operating System (iOS & Android), & Region—Global Forecast to 2024", Markets and Markets, printed Apr. 13, 2021, 8 pages. https://www.marketsandmarkets.com/Market-Reports/mobile-security-market-227793897.html.

Augmented Reality and Virtual Reality (AR & VR) Market Size is Expected to Reach USD 571.42 Billion by 2025 | Valuates Reports, Cision, PR Newswire, Feb. 13, 2020, 8 pages. https://www.prnewswire.com/in/news-releases/augmented-reality-and-virtual-reality-ar-amp-vr-market-size-is-expected-to-reach-usd-571-42-billion-by-2025-valuates-reports-800630665.html.

Mell et al., "The NIST Definition of Cloud Computing", Recommendations of the National Institute of Standards and Technology, Special Publication 800-145, Sep. 2011, 7 pages.

"Best AR Devices for 2020", PaleBlue, News, Feb. 3, 2020, PaleBlue Corporate, 9 pages. https://pale.blue/2020/02/03/best-ar-devices-for-2020/.

* cited by examiner

DYNAMIC BOUNDARY CREATION FOR VOICE COMMAND AUTHENTICATION

BACKGROUND

The present disclosure relates to authentication, and, more specifically, dynamic boundary creation for voice command authentication and execution.

A voice controlled device (VCD) can accept and execute voice commands from one or more users. In general, a VCD includes a microphone to hear voice commands. The VCD can then interpret the command, and execute the command. The types of VCD and the ability to understand and execute a growing number of commands is continually growing.

SUMMARY

Disclosed is a computer-implemented method to generate command boundaries for VCDs. The method includes, receiving a voice command. The method also includes defining a command boundary for a VCD, where the command boundary is based on the receiving of the input from the user. The method further includes receiving, from the user and by the VCD, a voice command. The method also includes determining an origination location of the voice command. The method includes classifying the voice command into a command category. The method further includes executing the voice command in response to determining the origination location is within the command boundary for the VCD. The method also includes storing a set of data for the voice command. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Cloud Computing in General

Figure 1:
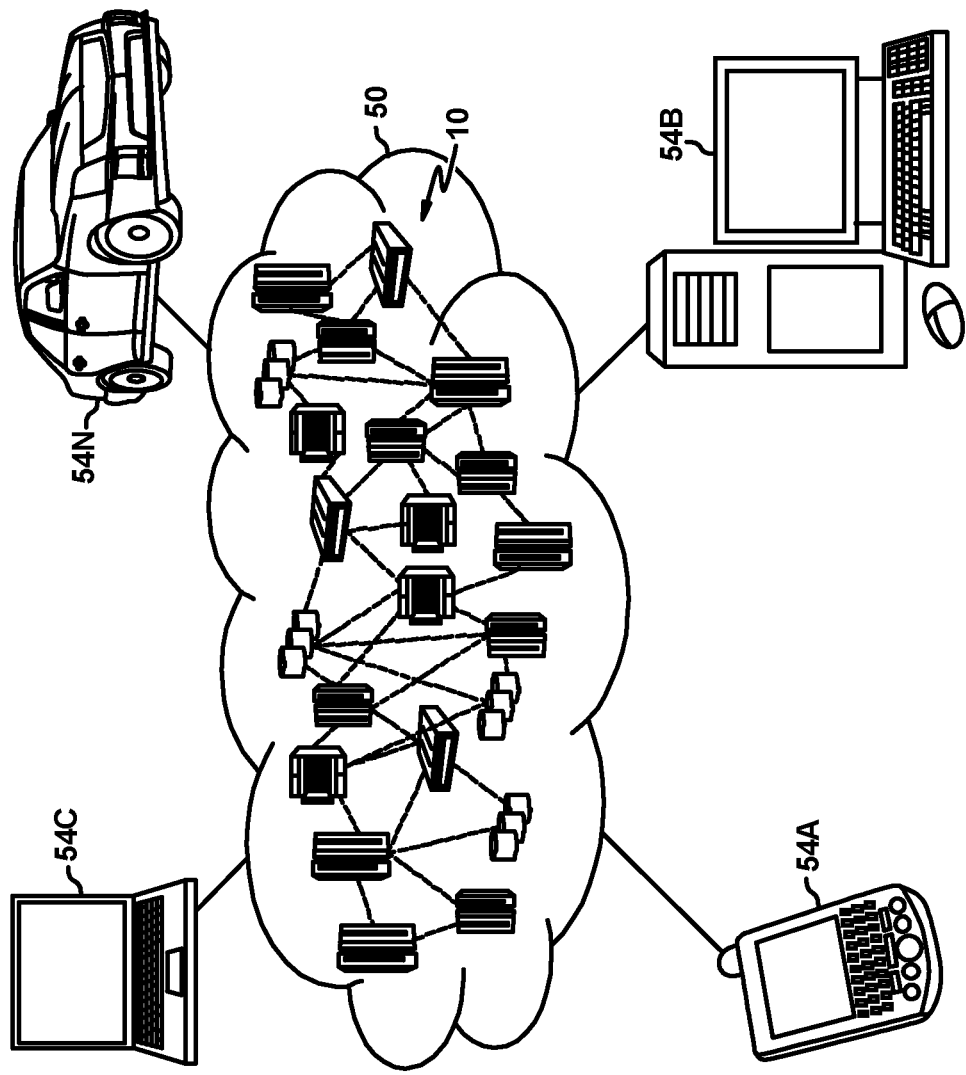
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
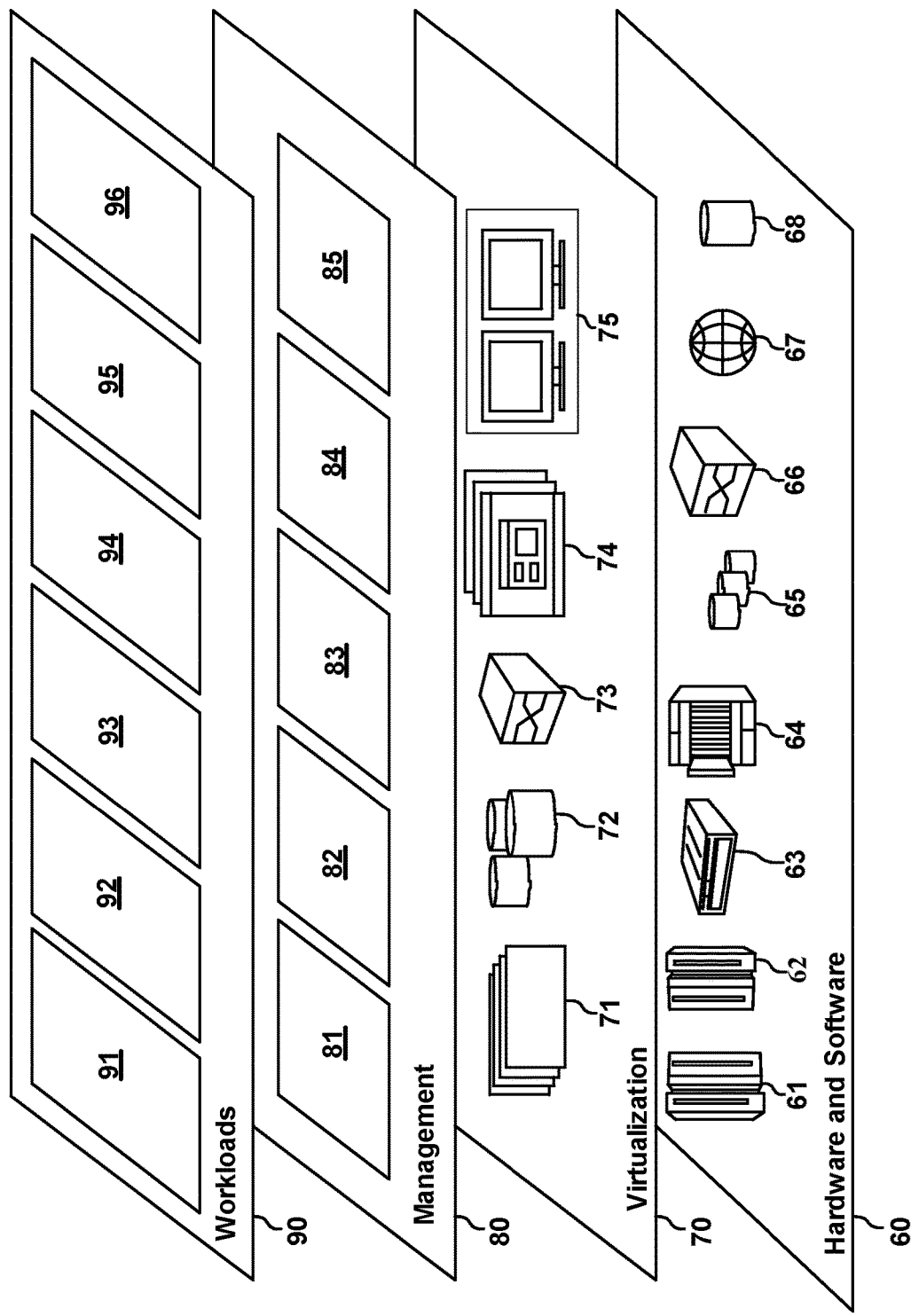
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and execution of voice commands from within a command boundary 96.

Data Processing System in General

Figure 3:
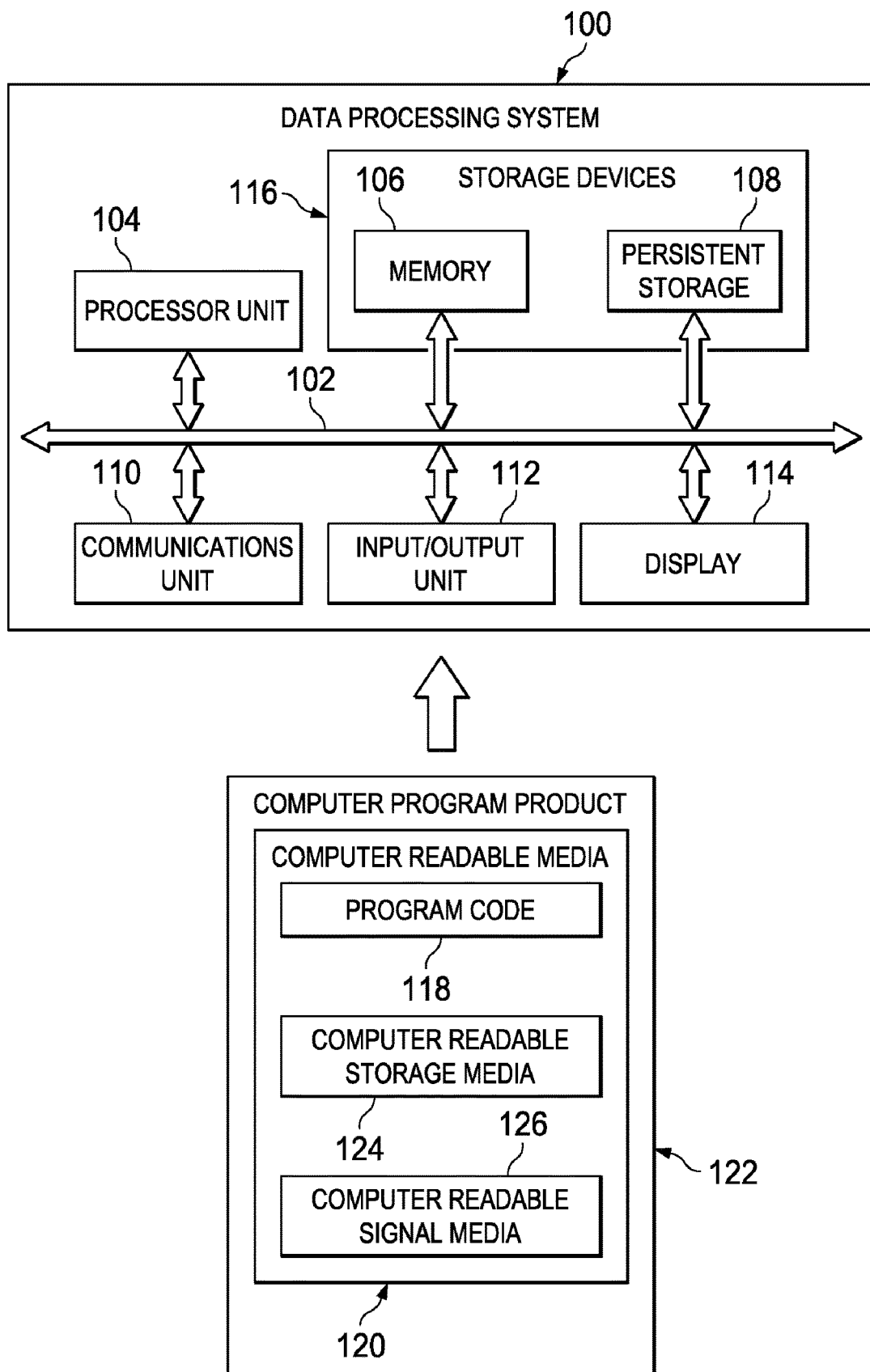
FIG. 3 is a block diagram of a DPS according to one or more embodiments disclosed herein.

FIG. 3 is a block diagram of an example data processing system (DPS) according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an Input/Output (I/O) unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

A voice-controlled device (VCD) can accept and execute voice commands from one or more users. In general, a VCD includes a microphone to hear voice commands. The VCD can then interpret the command, and execute the command. VCD's can also be known by or part other devices such as digital assistants, smart speakers, virtual assistants, voice assisted devices, among others. The types of VCD and the ability to understand and execute a growing number of commands is continually growing. However, as the number of devices and commands increases the chance for unintended consequences also increases. For example, consider a user that has two VCD in their home. The user can issue a command that says "Order product X." it is possible for both of the VCD's to hear and execute the command. The user may have unintentionally submitted two orders for the same product. Another example, if VCD is coupled with machinery in a warehouse, the voice command can active the machinery. Unintentionally activating multiple machines can increase risk of injury and/or other negative consequences. In some embodiments, VCD can add extra layers of security and/or authentication to limit unintentional commands from being executed. An unintentional command can be a wrong command, a command executed by a device that the user did not intent to interact with, and/or a command that is duplicated. Limiting command location can also provide additional security for bad actors. For example, a user can define a small area from which to perform financial transactions (e.g., order products). This will limit either an accidental order during unrelated conversation and/or prevent an unauthorized person (e.g., children, house guest) from performing an action.

Embodiments of the present disclosure can define a command boundary. In some embodiments, a VCD will only execute a command received from the command boundary.

Or said differently, the command will be executed when an origination point (or generation point) of the command is within a command location (or command boundary, or boundary). The command boundary can be an additional level of authentication and/or security to reduce the chance of an unintentional/unauthorized command being executed.

In some embodiments, the boundary is defined based on input from the user. The input can be received from an augmented reality (or virtual reality) system. In some embodiments, a user may draw a virtual line in the augmented reality interface. In some, the input can be received into a visualy generated layout of an area surrounding the VCD (e.g., a layout of a home, etc.). The line can be used to generate/define the command boundary. The command boundary may be in any shape, such as a line, broken line(s), curve, spline, etc. Boundaries may define a closed area or may be open. Boundaries may be defined using any standard mathematical technique or equation used to define boundary shapes. In some embodiments, the command boundary includes a dynamic lifetime. The dynamic lifetime can be when the command boundary will automatically delete/deactivate. The lifetime can be based on a time (e.g., hours, days, specific date, day of week, etc.), a number of uses, and or another trigger (e.g., door opening/shutting, number of people in a vicinity of the VCD, other individuals associated with the VCD, weather events, etc.).

In some embodiments, the device manager can determine an origination location of the command. The origination location can be the location of the user who speaks the command. The location can be determined using one or more of an Internet of Things (IoT) device, triangulation, video, network data (e.g., cellular network, Wi-Fi, etc.), and other similar methods.

In some embodiments, where multiple VCDs are present, each VCD is associated with a single command area. For example, if a home has a VCD in a bedroom and in a kitchen, a boundary of the bedroom can be established for the bedroom VCD and the kitchen/living area for the kitchen VCD. As another example, to initiate a machine in an industrial setting, each machine can have a single command area. In some embodiments, each VCD may have one or more command boundary. Each of the one or more command boundaries can be correlated to a type of command. The command, as they are received by device manager, can be categorized into a category (or command category). In some embodiments, the commands are executed when the category is consistent with the associated command boundary. In some embodiments, there can be one or more boundaries for each of the one or more VCD.

In some embodiments, the device manager includes a machine learning model (or learning model) (e.g., artificial intelligence). The learning model can be configured to analyze historical use of a device. Based on the analysis, the learning model can generate predictions for how/when a user will issue a voice command and/or generate a recommendation for command boundaries and/or command categories. In some embodiments, the recommendation can include a recommended dynamic lifetime. In some embodiments, the analysis and recommendations can be user specific and/or different for different users.

In some embodiments, the recommendation can include moving the boundary. For example, if a movable machine includes a VCD, the command area for the VCD can be a safe distance away from the machine. Another example, the boundary can be moved based on the location of the other VCD's, (e.g., a second machine with a VCD).

The aforementioned advantages are example advantages, and embodiments exist that can contain all, some, or none of the aforementioned advantages while remaining within the spirit and scope of the present disclosure.

Figure 4:
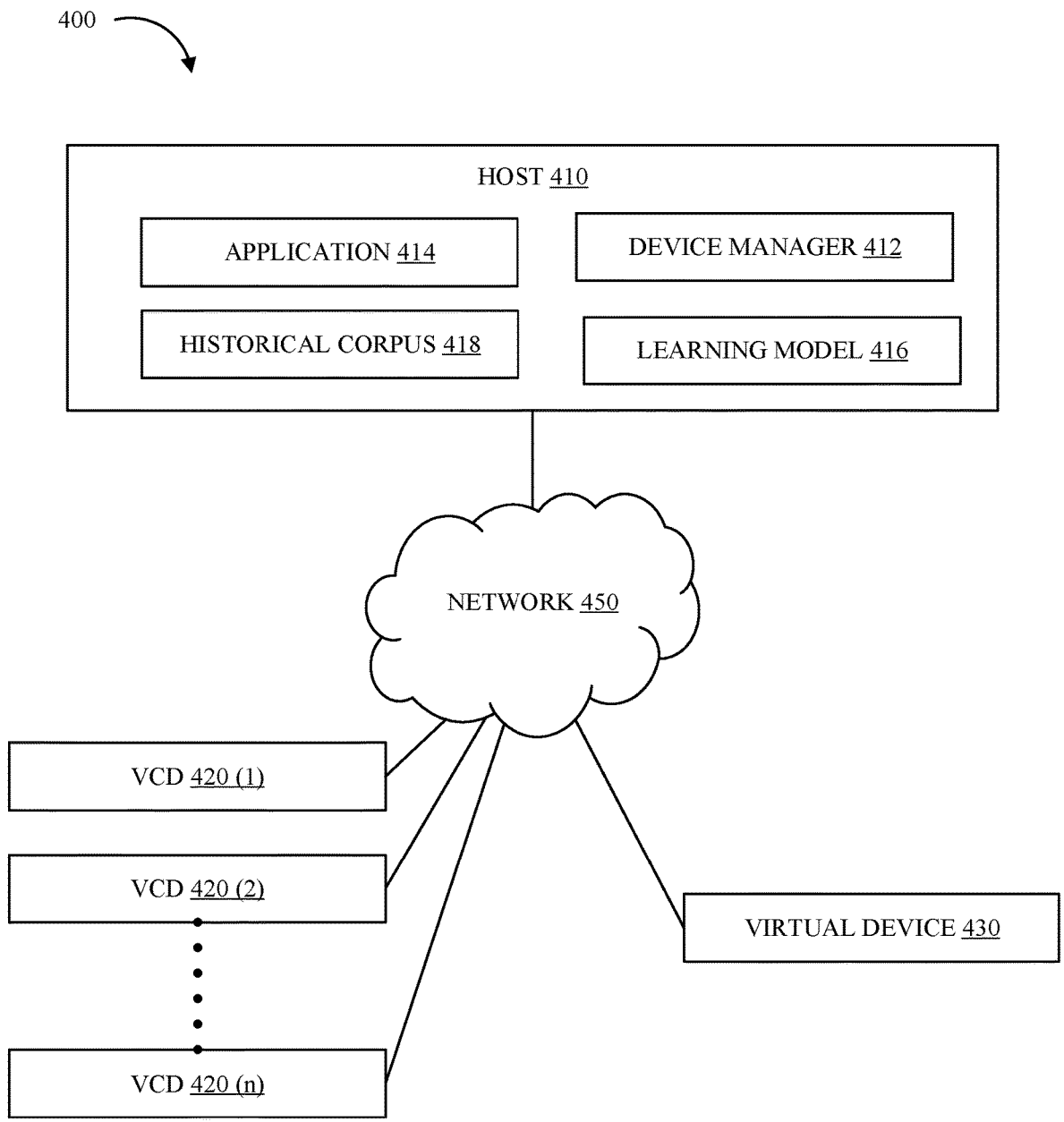
FIG. 4 illustrates a functional diagram of a computing environment suitable for operation of a device manager in accordance with some embodiments of the present disclosure.

Referring now to various embodiments of the disclosure in more detail, FIG. 4 is a representation of a computing environment 400, that is capable of running a device manager in accordance with one or more embodiments of the present disclosure. Many modifications to the depicted environment may be made by those skilled in the art without departing from the scope of the disclosure.

Computing environment 400 includes host 410, VCD 420(1), VCD 420(2), VCD 420(n), virtual device 430, and network 450. VCD 420(1), VCD 420(2), and VCD 420(n), can represent any number of additional VCDs and can be referred to a VCD 420 individually, collectively, or severally. Network 450 can be, for example, a telecommunications network, a local area network (LAN), a wide area network (WAN), such as the Internet, or a combination of the three, and can include wired, wireless, or fiber optic connections. Network 450 may include one or more wired and/or wireless networks that are capable of receiving and transmitting data, voice, and/or video signals, including multimedia signals that include voice, data, and video information. In general, network 450 may be any combination of connections and protocols that will support communications host 410, VCD 420, virtual device 430, and other computing devices (not shown) within computing environment 400. In some embodiments, each of host 410, VCD 420, virtual device 430, may include a computer system, such as the data processing system 100 of FIG. 3.

Host 410 can be a standalone computing device, a management server, a web server, a mobile computing device, or any other electronic device or computing system capable of receiving, sending, and processing data. In other embodiments, host 410 can represent a server computing system utilizing multiple computers as a server system, such as in a cloud computing environment (e.g., cloud computing environment 50). In some embodiments, host 410 includes container device manager 412, application 414, learning model 416, and historical corpus 418.

Device manager 412 can be any combination of hardware and/or software configured to execute voice commands based on a generation point of the command. In some embodiments, device manager 412 can define one or more command boundaries. The commands are executed when the originate from within the command boundary, and are not executed when the command originates outside the command boundary. In some embodiments, the command boundary is defined based on an input from a user. The input can be received from virtual device 430, and/or from VCD 420.

In some embodiments, device manager 412 identifies the location in which a command is generated/originated. In some embodiments, the location is where the user is located. In some embodiments, the location is identified using IoT devices. In some embodiments, the location is identified based on analyzing a video feed. For example, the command boundary can be defined as within the view of a camera. If a command is issued by a user within the view, then device manager 412 can determined, based on analyzing the video feed, the command originated from within the command boundary. In some embodiments, device manager 412 determines the location based on triangulation of network 450 (e.g., Wi-Fi, Cellular, I.P. Address, etc.). In some embodiments, the location is based on a global positioning system (GPS). The GPS can be included in and IoT device, in virtual device 430, in VCD 420, and/or in any other device associate the user.

In some embodiments, device manager 412 can define two or more command boundaries for a single VCD. Each of the one or more command boundaries can be associated with one or more command types (or command categories). In some embodiments, device manager 412 can define a single common area for each of two of VCDs. In some embodiments, device manager 412 can define two or more command boundaries for each of two or more VCD in a vicinity. In some embodiments, the two or more command areas (for both one VCD or two or more VCD's) can be overlapping or not overlapping. For example, a first boundary for a first VCD can include a boundary that is correlated to a kitchen and living area. A second command boundary can include a workstation within the living area. Another example, of not overlapping, the second boundary can be the same workstation, but the first boundary can be the kitchen and living area excluding the workstation.

Application 414 can be any combination of hardware and/or software configured to carry out a function on a computing device (e.g., host 410). In some embodiments, application 414 is a web application. In some embodiments, application 414 can be configured to execute a command received by device manager 412. For example, application 414 can include one or more of a streaming application (e.g., music, podcast, etc.), a search engine, a weather service, machinery control system, and the like. In some embodiments, application 414 can receive, execute, and return results/perform an event based on the received voice command. In some embodiments, application 414 is integrated into an additional device and can operation additional equipment (e.g., voice activated machinery).

Learning model 416 can be any combination of hardware and/or software configured to analyze historical corpus 418. In some embodiments, historical corpus can include training data for learning model 416. In some embodiments, the learning model 416 accepts and incorporates user feedback. The feedback can be requested from the user and/or received without a request. For example, if a user cancels a command within a predefined time after issuing the command, that cancelation can be used as feedback.

In some embodiments, learning model 416 can generate/recommend a command boundary for a VCD. The recommendation can be displayed on virtual device 430, host 410, and/or presented as an audible suggestion. In some embodiments, learning model 416 can be configured to generate/recommend categories of commands. In some embodiments, learning model 416 can suggest/assign a specific command into a category. The suggestion/determination can be based on similarity of other commands in the category. In some embodiments, learning model 416 can generate/recommend (or generate a recommendation) for a lifetime recommendation for each boundary. The lifetime can be a number of uses, a period of time, and/or an event trigger.

In some embodiments, learning model 416 may execute machine learning on data from the environment using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR). In some embodiments, the BBSH may execute machine learning using one or more of the following example techniques: principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), region-based convolution neural networks (RCNN), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Historical corpus 418 can be data related to how one or more users interact with one or more VCD's (e.g., VCD 420 in computing environment 400). Historical corpus 418 can include each command issued to VCD 420, the location the command was generated in, a time, a day, a category, feedback, and other similar data. In some embodiments, historical corpus 418 can be updated by the user. For example, a user can create a command type. In another example, the user can move a specific command from one type of command into a different command category. In some embodiments, historical corpus 418 allows the user to opt in and/or opt out of the type of data collected and analyzed. In some embodiments, historical corpus 418 includes additional user data. The additional user data can include messaging (e.g., email, text messages, etc.), calendar data, location data (e.g., IoT locates, GPS location, etc.), and other similar data. In some embodiments, historical corpus 418 acts as training data for learning model 416. As additional data is added, learning model 416 can be retrained and/or updated.

VCD 420 can be any combination of hardware and/or software configured to receive and execute a voice command from a user. In some embodiments, there can be any number of VCDs 420 in computing environment 400. In some embodiments, VCD 420 can be part of a device with additional functionality (e.g., smart phone, personal computers, projectors, automobiles, mechanical equipment, etc.) In some embodiments, VCD 420 can include computing device such as data processing system 100.

Virtual device 430 can be any configuration of hardware and/or software configured to interact with device manager 412. In some embodiments, virtual device 430 can receive input to define one or more command boundaries. The input can be received by a user drawing a boundary location with a finger, pencil, and/or other input device.

In some embodiments, virtual device 412 can display the location of one or more command boundaries. For example, virtual device 430 can display a colored line that outlines the command boundary. In some embodiments, each command boundary can include a label that indicates one or more command categories associated with the command boundary. If the user is outside the command boundary for the issued command, virtual device 430 can indicate so (e.g., sound, colored screen, prompt to move, etc.). There can also be a positive indication if the user is within the boundary. In some embodiments, virtual device 412 can provide audible and/or haptic feedback to the user. For example, if a user issues a command outside of the relevant command boundary virtual device 412 can make an audible noise (e.g., chime, ring, computer generated voice, etc.) that indicates the command will not be executed based on the generation location of the command. Additionally, virtual device 412 can vibrate or provide other haptic feedback indicating the same thing.

In some embodiments, virtual device 430 include a virtual reality system. A virtual reality system can be a combination of one or more computing devices that can generate visual, audio, and/or other sensations, that simulate a user physical presence in a virtual environment. In some embodiments, virtual device 430 include an augmented reality system. An augmented reality system can be a in interactive experience of a real-world environment where objects in the real world are enhanced by computer-generate information. For example, a smart phone can generate an overlay of command boundaries around furniture and other objects in a home/office.

Methods 500 and 600 can be implemented by one or more processors, host 410, device manager 412, application 414, learning model 416, historical corpus 418, VCD 420, virtual device 430, and/or a different combination of hardware and/or software. In various embodiments, the various operations of methods 500 and 600 are performed by one or more of host 410, device manager 412, application 414, learning model 416, historical corpus 418, VCD 420, virtual device 430. For illustrative purposes, the method 500 will be described as being performed by device manager 412.

Figure 5:
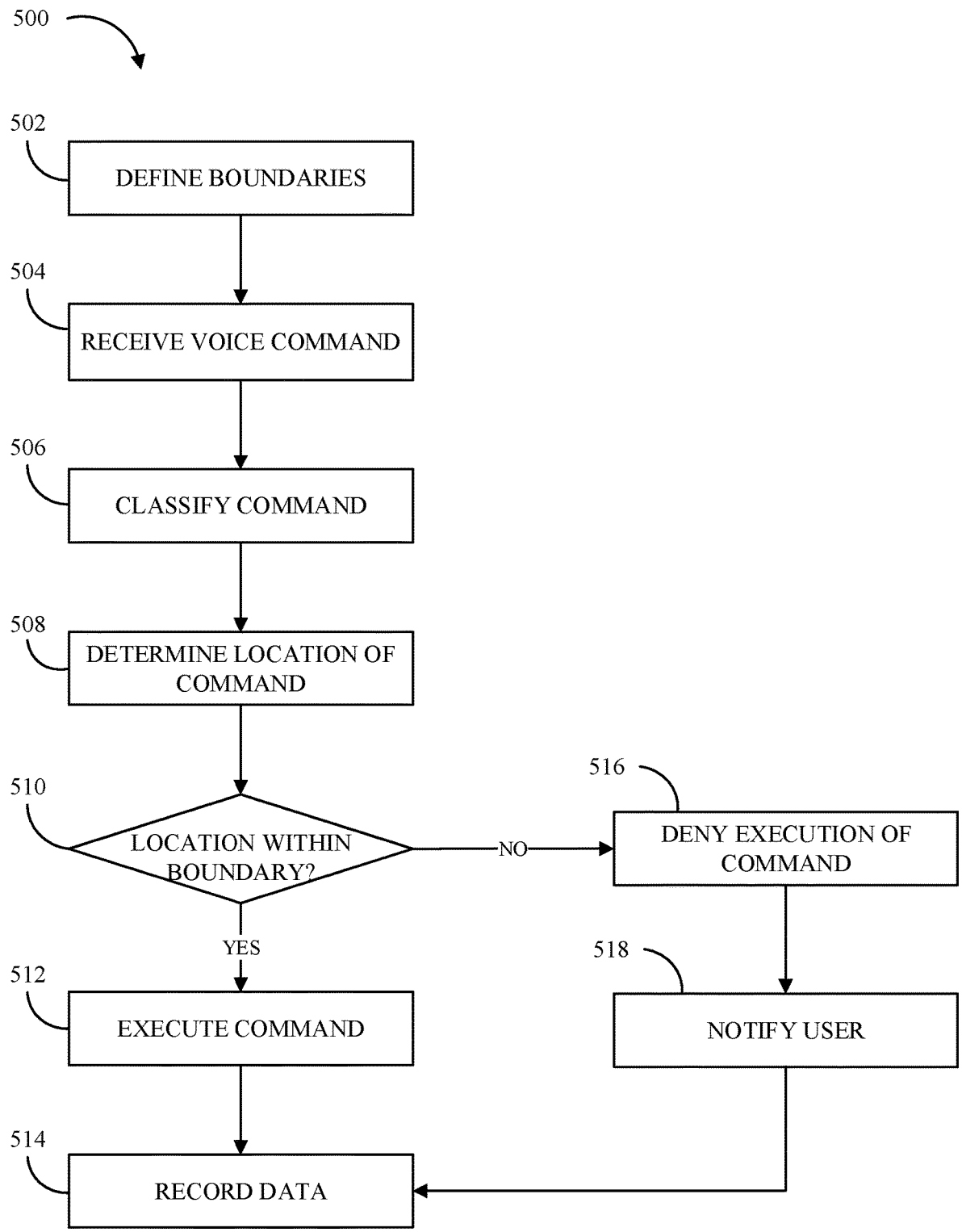
FIG. 5 illustrates a flow chart of an example method to execute voice commands from a command boundary in accordance with some embodiments of the present disclosure.

FIG. 5 depicts a flowchart of an example method, method 500, for dynamic boundary creation for voice command authentication that can be performed in a computing environment (e.g., computing environment 400 and/or cloud computing environment 50). One or more of the advantages and improvements described above for dynamic boundary creation for voice command authentication may be realized by method 500, consistent with various embodiments of the present disclosure.

At operation 502, device manager 412 defines command boundaries. In some embodiments, one ore more command boundaries are defined. Each of the one or more command boundaries can be correlated to a type of command. In some embodiments, each of the boundaries can be correlated to a specific user. In some embodiments, each of the boundaries is correlated to a user and a command type. The correlation can be configured such that a command is executed only when each of the correlated users and/or or locations are satisfied.

In some embodiments, the boundaries are defined based on an input from a user. The input can be received from virtual device 430. In some embodiments, the user can draw a boundary in virtual device 430 to define the boundaries. In some embodiments, the one or more boundaries may overlap. The overlapping boundaries can be for the same and/or different users. In some embodiments, each of the boundaries has a unique boundary (e.g., no overlap). The uniqueness can be for a single user and/or the uniqueness can be for all boundaries for a VCD. In some embodiments, the one or more boundaries can be for one or more VCD's. For example, if there are two VCD's in an area, there can be one or more boundaries defined for each VCD.

In some embodiments, each of the boundaries can be permanent or temporary. A temporary boundary stays active until a predetermined event takes place, such as the expiration of a predetermined period of time (e.g., 2 hours, 2 weeks, etc.). In some embodiments, the predetermined event is a number of commands. For example, a boundary can be active until it execute three commands of the associated type. In some embodiments, the predetermined event can be based on a trigger. The trigger can be any factor. Some potential triggers include number of people in an area (e.g., deactivativation with three or more people in the area), an IoT device action (e.g., a door opening/closing, etc.), and/or other similar triggers.

At operation 504, device manager 412 receives a voice command. In some embodiments, the command is received from a user. In some embodiments, the voice command is directed to one or more VCDs. In some embodiments, the command is received by one or more VCDs. In some embodiments, receiving the command includes interpreting the command. Interpreting the command can include identifying a specific action the user intends to have performed. In some embodiments, one or more of natural language processing and speech can be used to identify the commands. In some embodiments, known methods and programs can be used to interpret the command.

At operation 506, device manager 412 classifies the command. In some embodiments, the VCD uses one or more of natural language processing and speech to text to identify a command. In some embodiments, classifying the command is based on the interpretation of the command in operation 504.

In some embodiments, the classification is selected from a predefined list. The list can updated and/or changed. In some embodiments, the classification is determined by learning model 416. Learning model 416 can classify the command based on similar commands and their classifications and feedback stored in historical corpus 418. In some embodiments, the classification of a common command can be user specific. For example, for user A, a command of "turn on the light" can be classified in a business category, and for user B, the same command can be in a personal category. In some embodiments, the categories can include one or more of, financial, personal, entertainment, security, safety, work, business, cooking, parenting, games, and the like.

At operation 508, device manager 412 determines a location of the command. In some embodiments, the location of the command is an originating location of the command. The originating location can be the location of a user when speaking the command. In some embodiments, the location is identified based on one or more of GPS, IoT, Bluetooth, video feeds, triangulation, network signals, and the like. In some embodiments, the location is an approximate location.

At operation 510, device manager 412 determines if the command origination location is within the defined command boundary for the classification of the command. In some embodiments, the determination is made by comparing the location against the command boundary for the classification. If device manager 412 determines the location is within the command boundary (510:YES), then device manager 412 proceeds to operation 512. If device manager 412 determines the location is not within the command boundary (510:NO), then device manager 412 proceeds to operation 516.

At operation 512, device manager 412 manager executes the command. In some embodiments, the command is executed by the VCD which it was received. In some embodiments, the VCD passes the command to application 414 which executes the command. The results/confirmation can then be returned to the VCD and/or to the user.

At operation 514, device manager 412 records the command data. In some embodiments, the command data is recorded in historical corpus 418. In some embodiments, the command data includes the command, the command location, the assigned category, and any feedback. The feedback can be requested. For example, the VCD can ask if the command classification is correct. In some embodiments, the feedback can be inferred. For example, if the command is canceled, repeated, and/or slightly changed that can indicate an error made by embodiments of the present disclosure. The data can be used to update learning model 416 in an attempt to prevent repeat errors.

At operation 516, device manager 412 denies/prevents execution of the voice command. In some embodiments, denying includes not executing the command.

At operation 518, device manager 412 notifies the user the command location is outside the command boundary. The notifications can be an audible, visual, haptic, and/or other sensory indication. In some embodiments, the notification includes displaying the location of the command boundaries. The display can be on virtual device 430. In some embodiments, the notification includes an indication the command is not executed. In some embodiments, the notification includes a prompt to move the command location into the boundary, update the command classifications, and/or change the command boundaries. Upon completion of operation 518, device manager 412 proceeds to operation 514.

Figure 6:
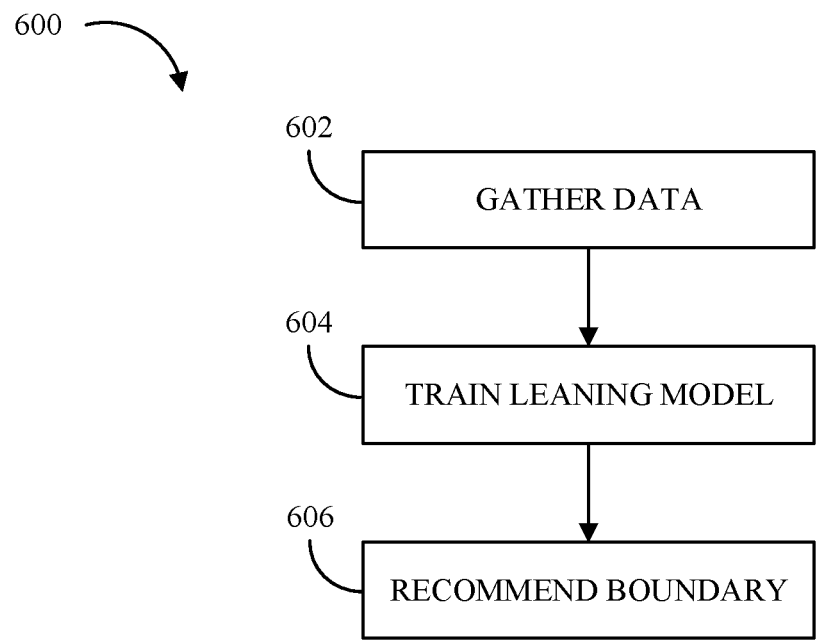
FIG. 6 illustrates a flow chart of an example method to generate a recommendation for a command boundary in accordance with some embodiments of the present disclosure.

FIG. 6 depicts a flowchart of an example method, method 600, for generating a recommendation for a command boundary that can be performed in a computing environment (e.g., computing environment 400 and/or cloud computing environment 50). One or more of the advantages and improvements described above for dynamic boundary creation for voice command authentication may be realized by method 500, consistent with various embodiments of the present disclosure.

At operation 602, device manager 412 gathers data. In some embodiments, the data is command data. In some embodiments, the data is gathered consistent with operation 514 of method 500. In some embodiments, the data is gathered prior to the establishment of the one or more command boundaries.

At operation 604, device manager 412 trains learning model 416. In some embodiments, learning model 416 can be trained to recommend one or more command boundaries. In some embodiments, learning model 416 can be trained to classify commands. In some embodiments, learning model 416 can be trained to recommend a new/update to the command categories (e.g., adding a new category, removing an existing category, moving a command between categories, etc.). In some embodiments, learning model 416 can be trained to recommend a time frame for a command boundary to be active. The recommendation can be for a trigger, a time, and/or a number of uses.

At operation 606, device manager 412 recommends one or more command boundaries to the user. In some embodiments, the recommendations can be sent to the user by VCD 420 and/or virtual device 430. In some embodiments, the recommendation can include altering/removing command boundaries. The recommendation can also include combining two separate command boundaries for different classifications into a single boundary and/or splitting a boundary for two classifications into two separate boundaries. In some embodiments, the recommendation includes a time for the boundary to be active for each of the recommended boundaries.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving an input from a user;
   defining a command boundary for a voice controlled device (VCD), wherein the command boundary is based on the receiving the input from the user, and the command boundary outlines a physical area;
   receiving, from the user by the VCD and in response to the defining the command boundary, a voice command, wherein the receiving the voice command is in response to the defining the command boundary;
   determining an origination location of the voice command;
   determining the origination location of the voice command is within the command boundary;
   classifying the voice command into a command category;
   executing the voice command in response to the determining the origination location is within the command boundary for the VCD; and
   storing a set of data for the voice command.

2. The method of claim 1, wherein the command boundary is a first command boundary, the method further comprising:
   defining a second command boundary for the VCD, wherein the first command boundary is associated with a first command category, and the second command boundary is associated with a second command category.

3. The method of claim 2, wherein the executing the voice command is in response to the command category being the same as the first command category.

4. The method of claim 2, wherein the first command boundary and the second command boundary do not overlap.

5. The method of claim 2, wherein the first command boundary and the second command boundary at least partially overlap.

6. The method of claim 2, wherein the first command boundary is associated with the user, and the second command boundary is associated with a second user.

7. The method of claim 1 further comprising:
   training a learning model, by a set of training data, to generate a recommendation for first command boundary, wherein the defining the first command boundary is in response to the generating of the recommendation.

8. The method of claim 7, further comprising updating, in response to receiving feedback from the user, the learning model.

9. The method of claim 1, wherein the command boundary is configured to deactivate in response to a trigger.

10. The method of claim 9, wherein the trigger is includes executing a predetermined number of commands from the first command boundary.

11. The method of claim 9, wherein the trigger is based on a period of time.

12. The method of claim 1, wherein the input from the user is received from a virtual device.

13. The method of claim 12, wherein the input is based on a user-drawn boundary on an interface of the virtual device.

14. The method of claim 12, wherein the voice command is a second voice command and the origination location is a second origination location, the method further comprising:
receiving, from the user, a first voice command;
determining a first origination location of the first voice command;
determining the first origination location is outside of the command boundary;
prompting, in response to determining the first origination location is outside the command area, the user to move into the command area; and
receiving, from the user, the second voice command.

15. The method of claim 14, wherein the prompting includes displaying, on the virtual device, the command boundary.

16. A system comprising:
a processor; and
a computer-readable storage medium communicatively coupled to the processor and storing program instructions which, when executed by the processor, are configured to cause the processor to:
define a first command boundary for a first voice controlled device (VCD), wherein the first command boundary is based on receiving an input from a user, and the command boundary outlines a physical area;
receive, from the user by the first VCD and in response to the defining the command boundary, a voice command;
determine an origination location of the voice command;
determine the origination location of the voice command is within the command boundary;
classify the voice command into a command category;
determine the origination location is within the first command boundary;
execute, by the first VCD and in response to the determination the origination location is within the first command boundary, the voice command; and
store a set of data for the voice command.

17. The system of claim 16, and the program instructions are further configured to cause the processor to:
define a second command boundary for a second VCD;
receive, from the user and by the second VCD, the voice command;
determine the origination location is outside the second command boundary; and
deny, by the second VCD and in response to the determination the origination location is outside the second command boundary, execution of the voice command.

18. The system of claim 17, wherein the user is a first user, the first command boundary is correlated to the first user, the defining of the second command boundary is based on receiving an input from a second user, and the second command boundary is correlated to the second user.

19. A computer program product, the computer program product comprising a computer readable storage medium having program instructions embodied therewith, the program instructions executable by a processing unit to cause the processing unit to:
define a first command boundary for a first voice controlled device (VCD), wherein the first command boundary is based on receiving an input from a user, and the command boundary outlines a physical area;
receive, from the user by the first VCD and in response to the defining the command boundary, a voice command;
determine an origination location of the voice command;
determine the origination location of the voice command is within the command boundary;
classify the voice command into a command category;
execute the voice command in response to determining the origination location is within the command boundary for the VCD; and
store a set of data for the voice command.

20. The computer program product of claim 19, wherein the program instructions are further configured to cause the processing unit to:
define a second command boundary for a second VCD;
receive, from the user and by the second VCD, the voice command;
determine the origination location is outside the second command boundary; and
deny, by the second VCD and in response to the determination the origination location is outside the second command boundary, execution of the voice command.

* * * * *